US012097694B2

(12) United States Patent
Karakatsanis

(10) Patent No.: US 12,097,694 B2
(45) Date of Patent: Sep. 24, 2024

(54) INK SUPPLY SYSTEM

(71) Applicant: BOBST BIELEFELD GmbH, Bielefeld (DE)

(72) Inventor: Michael Karakatsanis, Dallgow-Döberitz (DE)

(73) Assignee: BOBST BIELEFELD GMBH, Bielefeld (DE)

( * ) Notice: Subject to any disclaimer, the term of this patent is extended or adjusted under 35 U.S.C. 154(b) by 305 days.

(21) Appl. No.: 17/593,633

(22) PCT Filed: Mar. 24, 2020

(86) PCT No.: PCT/EP2020/025143
§ 371 (c)(1),
(2) Date: Sep. 22, 2021

(87) PCT Pub. No.: WO2020/200519
PCT Pub. Date: Oct. 8, 2020

(65) Prior Publication Data
US 2022/0176691 A1 Jun. 9, 2022

(30) Foreign Application Priority Data
Apr. 5, 2019 (EP) .................................... 19020263

(51) Int. Cl.
*B41F 31/02* (2006.01)
*B41F 31/08* (2006.01)

(52) U.S. Cl.
CPC ............ *B41F 31/027* (2013.01); *B41F 31/08* (2013.01)

(58) Field of Classification Search
CPC ............................... B41F 31/027; B41F 31/08
See application file for complete search history.

(56) References Cited

U.S. PATENT DOCUMENTS

| | | | | | |
|---|---|---|---|---|---|
| 4,615,295 | A | * | 10/1986 | Wittkopf ................ | B41F 31/20 118/212 |
| 5,497,702 | A | * | 3/1996 | Gorter ..................... | B05C 1/086 101/366 |
| 5,878,663 | A | * | 3/1999 | Krzyzak .................. | B41F 7/32 101/148 |

(Continued)

FOREIGN PATENT DOCUMENTS

| | | | |
|---|---|---|---|
| CN | 102529392 | A | 7/2012 |
| CN | 103448363 | A | 12/2013 |

(Continued)

OTHER PUBLICATIONS

International Search Report issued May 28, 2020 in corresponding International Application No. PCT/EP2020/025143 (4 pages).

*Primary Examiner* — David H Banh
(74) *Attorney, Agent, or Firm* — Bookoff McAndrews, PLLC

(57) ABSTRACT

An ink supply system (10) comprises an ink chamber (12); an ink line (14) with a Venturi nozzle (16), wherein the ink chamber (12) has an inlet (18), which is connected to the ink line (14) upstream of the Venturi nozzle (16), and an outlet (24), which is connected to the suction side of the Venturi nozzle (16); an ink reservoir (30) from which the ink is transferred by a pump (28) to the inlet (18) and into the ink line (32); and an ink return line (32), which connects the downstream end of the Venturi nozzle (16) with the ink reservoir (30).

13 Claims, 2 Drawing Sheets

(56) References Cited

U.S. PATENT DOCUMENTS

Figure 1:
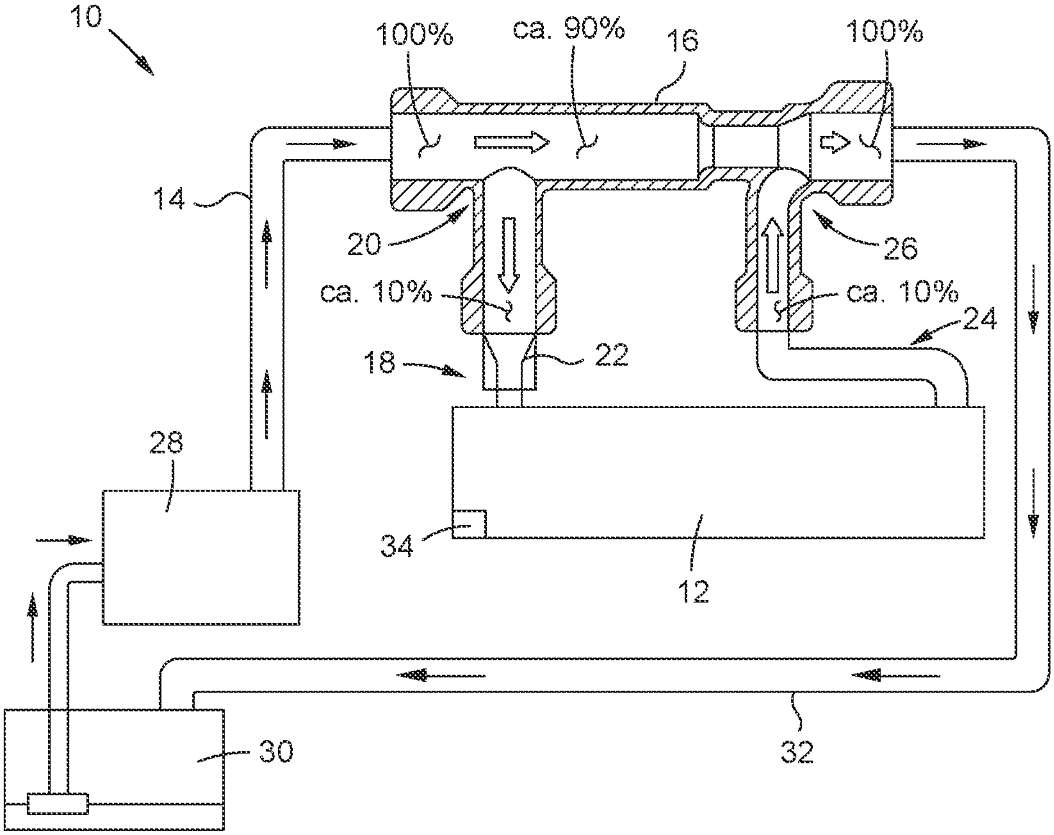

| | | | | |
|---|---|---|---|---|
| 6,152,032 | A * | 11/2000 | Belanger | B41F 7/30<br>101/147 |
| 2002/0046664 | A1* | 4/2002 | Szarka | B41F 7/32<br>101/148 |
| 2006/0114303 | A1* | 6/2006 | Telljohann | B41F 31/027<br>347/89 |
| 2009/0320704 | A1* | 12/2009 | Izume | B41F 31/14<br>101/367 |
| 2012/0167791 | A1* | 7/2012 | Nadachi | B41F 35/00<br>101/483 |

FOREIGN PATENT DOCUMENTS

| | | | |
|---|---|---|---|
| CN | 205601376 | U | 9/2016 |
| DE | 102009046078 | A1 | 5/2011 |
| EP | 0958920 | A1 | 11/1999 |
| EP | 1625935 | A1 | 2/2006 |
| WO | 2011035130 | A1 | 3/2011 |

* cited by examiner

INK SUPPLY SYSTEM

CROSS-REFERENCE TO RELATED APPLICATION(S)

This application is a National Stage under 35 U.S.C. § 371 of International Application No. PCT/EP2020/025143, filed Mar. 24, 2020, which claims priority to European Patent Application No. 19020263.0, filed Apr. 5, 2019, the contents of all of which are incorporated by reference in their entirety.

The invention relates to an ink supply system comprising an ink chamber, an ink line, an ink reservoir and an ink return line.

For inking rollers, for example an anilox roller, of a rotary printing press or a flexo press, ink chambers or ink fountains are used for supplying the inking rollers with ink. The ink chamber contains a certain amount of ink, of which a small portion is taken up by the roller and transferred to a printing medium.

To guarantee that a sufficient amount of ink is present in the ink chamber, an ink supply system is used which pumps ink from an ink reservoir to the ink chamber. To ensure a constant quality of the ink, it is constantly circulated within the ink supply system. Therefore, there is a first pump which pumps ink from the ink reservoir to the ink chamber and a second pump which pumps ink from the ink chamber back towards the ink reservoir.

However, the pumping flow rate of the two pumps needs to be finely calibrated to ensure a constant flow rate into and from the ink chamber. Miscalibrations can lead to uncontrolled ink blow-outs, which increase the risk of ink leaking out from the ink chamber or within the ink supply system.

The object of the invention is to provide a simple and stable ink supply system.

In order to solve the object, the invention provides an ink supply system, comprising an ink chamber; an ink line with a Venturi nozzle, the ink chamber having an inlet which is connected to the ink line upstream of the Venturi nozzle, and an outlet which is connected to the suction side of the Venturi nozzle; an ink reservoir from which the ink is transferred by a pump to the inlet and into the ink line; and an ink return line which connects the downstream end of the Venturi nozzle with the ink reservoir.

The ink supply system of the invention uses only a single pump to transfer ink from the ink reservoir to the inlet of the ink chamber and into the ink line. No additional pump is necessary for removing the ink from the ink chamber as the Venturi nozzle provides a pressurized suction at the outlet of the ink chamber. This reduces the cost for the equipment and for maintenance of the pumps.

The flow rate within the ink supply system can be kept constant by the pump. As the Venturi nozzle provides a stable pressurized suction based on this constant flow rate, the inlet and outlet flow rate to and from the ink chamber is constant, too.

An additional advantage is that higher flow rates can be used without the need for a second pump, as the Venturi nozzle will provide a stable flow rate through the ink chamber for a wide range of flow rates within the ink supply system.

Furthermore, the Venturi nozzle will to a certain degree dampen any oscillations of the flow rate, for example based on changes in the viscosity or temperature of the ink within the ink supply system, rendering the ink supply system much more stable without the need to operate an additional active element like a pump.

By providing an ink return line which connects the downstream end of the Venturi nozzle with the ink reservoir, a circulation system can be established, minimizing the amount of ink loss.

The ink reservoir can be an exchangeable ink cartridge so that the type of ink which is circulated within the ink supply system can be changed quickly and easily.

The ink line has a junction upstream of the Venturi nozzle, so a branched line can be connected to the inlet of the ink chamber. One of the branches, in which the larger amount of ink runs, tapers in diameter at the Venturi nozzle. The other branch, in which the smaller amount of ink runs, is the one which connects the ink line with the inlet of the ink chamber.

The outlet of the ink chamber is connected to the suction side of the Venturi nozzle. Therefore, the Venturi nozzle provides a pressurized suction from the ink chamber. Downstream of the Venturi nozzle, the stream from the ink line and from the outlet of the ink chamber are recombined.

According to an embodiment of the invention, the inlet comprises a neck. The neck can be used to further control the inlet flow rate into the ink chamber. As the flow rate through the ink chamber is constant due to the Venturi nozzle, by controlling the inlet flow rate, the outlet flow rate is controlled, too.

According to another embodiment of the invention, the outlet of the ink line comprises an ink overflow. The ink overflow prevents the ink in the ink chamber to exceed a maximum level within the ink chamber and at the same time ensures that the ink cannot be removed from the ink chamber when the ink level is too low. This ensures that the roller of the printing system does always get in contact with the same amount of ink.

The ink overflow can comprise a cleaning valve to provide a means for removing ink from the ink chamber, e.g. during maintenance.

To provide a circulation of the ink through the ink chamber, the inlet and outlet can be arranged at opposite sides of the ink chamber.

Additionally, the ink chamber can comprise a level sensor. Through this sensor, information on the current amount of ink within the ink chamber can be obtained. The ink sensor could be coupled to the pump of the ink supply system, so that the flow rate could be increased or decreased when the ink level within the ink chamber gets too low or too high, respectively.

The invention will now be described with reference to an embodiment which is shown in the enclosed drawings. In the drawings, FIG. 1 is a ink supply system according to the invention, and FIG. 2 is a view on the ink overflow and its connection to the Venturi nozzle.

Figure 2:
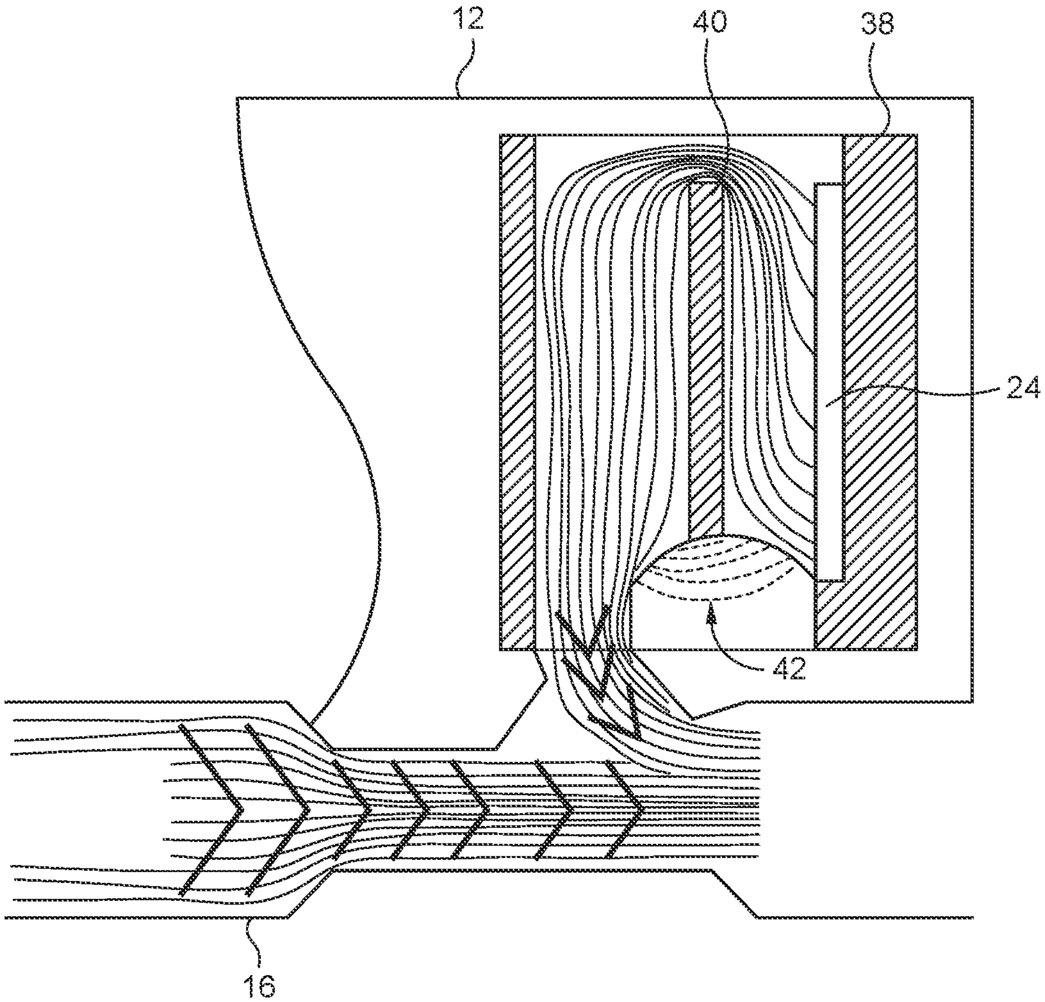

In FIG. 1, an ink supply system 10 is shown, which comprises an ink chamber 12 and an ink line 14 with a Venturi nozzle 16. The ink chamber 12 has an inlet 18 which is connected to the ink line 14 upstream of the Venturi nozzle 16 at a first junction 20.

At the first junction 20 the ink stream is divided into two parts, wherein the larger amount of ink, approximately 90% based on total volume, continues to flow through the ink line 14 to the Venturi nozzle 16. The smaller amount of ink, approximately 10% based on total volume, flows in the inlet 18 and through a neck 22 into the ink chamber 12.

The ink chamber 12 further has an outlet 24 which is connected to the suction part of the Venturi nozzle 16 at a second junction 26. The pressure in the suction part of the Venturi nozzle 16 can be controlled by the diameter of a constriction of the Venturi nozzle 16.

The amount of ink which passes through the ink chamber 12 can be controlled by the flow rate within the ink supply system 10. The flow rate is controlled by a pump 28 which connects an ink reservoir 30 with the ink line 14.

From the downstream end of the Venturi nozzle 16, an ink return line 32 runs to the ink reservoir 30. Therefore, the ink supply system 10 can be operated as a circulation system.

The ink chamber 12 further comprises a level sensor 34, which is used to monitor the amount of ink within the ink chamber 12. The level sensor 34 could also be connected to a monitoring system 36, which is able to control the pump 28, therefore establishing a feedback-loop.

In FIG. 2, an enlarged view of the outlet 24 of the ink chamber 12 is provided.

As can be seen, the outlet 24 further comprises an ink overflow 38. The ink overflow 38 has a boundary 40, over which the ink has to pass in order to flow back into the suction part of the Venturi nozzle 16. In this way, a constant ink level within the ink chamber 12 can be maintained.

The ink overflow 38 further comprises a cleaning valve 42 with which the ink from the ink chamber 12 can be removed, e.g. for maintenance purposes.

The invention claimed is:

1. An ink supply system, comprising:

an ink chamber;

an ink line with a Venturi nozzle, wherein the ink chamber has an inlet, which is connected to the ink line upstream of the Venturi nozzle, and an outlet, which is connected to a suction side of the Venturi nozzle;

an ink reservoir from which ink is transferred by a pump to the inlet and into the ink line; and an ink return line, which connects a downstream end of the Venturi nozzle with the ink reservoir, wherein the ink chamber is configured to guide the ink to flow through the ink chamber in two oppositely disposed directions, and wherein the ink chamber comprises a boundary that maintains a constant level of ink in the ink chamber and guides the ink to flow in the two oppositely disposed directions.

2. The ink supply system of claim 1, wherein the inlet comprises a neck.

3. The ink supply system of claim 1, wherein the outlet of the ink line comprises an ink overflow.

4. The ink supply system of claim 1, wherein the inlet and the outlet are arranged at opposite sides of the ink chamber.

5. The ink supply system of claim 1, wherein the ink chamber comprises a level sensor.

6. The ink supply system of claim 1, wherein the boundary is configured such that ink must flow around the boundary in order to flow into a suction part of the Venturi nozzle.

7. The ink supply system of claim 6, wherein a cleaning valve is positioned between the boundary and the Venturi nozzle.

8. An ink supply system, comprising:

an ink chamber including an inlet, an outlet, and a boundary at the outlet of the ink chamber;

an ink line with a Venturi nozzle, wherein the inlet of the ink chamber is connected to the ink line upstream of the Venturi nozzle and the outlet of the ink chamber is connected to a suction side of the Venturi nozzle;

an ink reservoir from which ink is transferred by a pump to the inlet and into the ink line; and an ink return line, which connects a downstream end of the Venturi nozzle with the ink reservoir, wherein ink must flow around a first side of the boundary to enter the suction side of the Venturi nozzle, and wherein the ink chamber further includes a cleaning valve positioned at a second side, opposite to the first side, of the boundary.

9. The ink supply system of claim 8, wherein removal of the cleaning valve from the ink chamber allows ink to flow around the second side of the boundary.

10. The ink supply system of claim 8, wherein the ink enters the Venturi nozzle at or after a narrow part of the Venturi nozzle.

11. The ink supply system of claim 8, wherein the ink chamber further includes a level sensor.

12. The ink supply system of claim 8, wherein the boundary guides the ink to flow in a first direction on a side of the boundary facing toward the outlet and to flow in a second direction, oppositely disposed to the first direction, on a side of the boundary facing away from the outlet.

13. The ink supply system of claim 12, wherein ink flows vertically upwards on an upstream side of the boundary and vertically downwards on a downstream side of the boundary.

* * * * *